United States Patent
Servadio et al.

(10) Patent No.: US 11,345,266 B2
(45) Date of Patent: May 31, 2022

(54) HEADREST WITH LOUDSPEAKER FOR VEHICLE SEAT

(71) Applicant: ASK INDUSTRIES SOCIETA' PER AZIONI, Monte San Vito (IT)

(72) Inventors: Maurizio Servadio, Monte San Vito (IT); Tiziano Nili, Reggio Emilia (IT)

(*) Notice: Subject to any disclaimer, the term of this patent is extended or adjusted under 35 U.S.C. 154(b) by 176 days.

(21) Appl. No.: 16/961,179

(22) PCT Filed: Jan. 22, 2019

(86) PCT No.: PCT/EP2019/051473
§ 371 (c)(1),
(2) Date: Jul. 9, 2020

(87) PCT Pub. No.: WO2019/145283
PCT Pub. Date: Aug. 1, 2019

(65) Prior Publication Data
US 2021/0061152 A1    Mar. 4, 2021

(30) Foreign Application Priority Data

Jan. 24, 2018   (IT) .................. 102018000001720

(51) Int. Cl.
*B60N 2/879*   (2018.01)
*H04R 1/02*   (2006.01)
*B60R 11/02*   (2006.01)

(52) U.S. Cl.
CPC .......... *B60N 2/879* (2018.02); *B60R 11/0217* (2013.01); *H04R 1/025* (2013.01)

(58) Field of Classification Search
CPC .......... B60N 2/879; H04R 1/025; A47C 7/38; A47C 7/727; B60R 11/0217
See application file for complete search history.

(56) References Cited

U.S. PATENT DOCUMENTS

| | | | | |
|---|---|---|---|---|
| RE33,423 E | * | 11/1990 | Lobanoff | B60N 2/879 |
| | | | | 297/410 |
| 9,327,628 B2 | * | 5/2016 | Subat | B60R 11/0217 |
| 2018/0035185 A1 | * | 2/2018 | Fujita | H04R 1/02 |
| 2019/0019494 A1 | * | 1/2019 | Wheeler | H04R 1/326 |

FOREIGN PATENT DOCUMENTS

| | | | |
|---|---|---|---|
| EP | 3072733 A1 | 9/2016 | |
| JP | 2005159914 A | 6/2005 | |
| WO | WO-2012171846 A1 * | 12/2012 | H04R 1/00 |

OTHER PUBLICATIONS

International Search Report for corresponding PCT/EP2019/051473.
Written Opinion of the ISA for corresponding PCT/EP2019/051473.

* cited by examiner

*Primary Examiner* — David R Dunn
*Assistant Examiner* — Tania Abraham
(74) *Attorney, Agent, or Firm* — Egbert, McDaniel & Swartz, PLLC

(57) ABSTRACT

A headrest suitable for being fastened to a vehicle seat having: an upper support portion, a reinforcing frame connected to the upper support portion for fastening the upper support portion to the vehicle seat, and an array of microphones comprising microphones disposed inside seats obtained in the headrest, in such a way that the microphones can be used to capture the sounds from the user sitting on the seat where the headrest is connected, as well as environmental microphones to capture the environmental noise perceived around the headrest.

12 Claims, 9 Drawing Sheets

HEADREST WITH LOUDSPEAKER FOR VEHICLE SEAT

The present patent application for industrial invention relates to a headrest with loudspeaker for a vehicle seat.

Audio systems for vehicles are known, which comprise a plurality of diffusers that operate at medium and high frequencies, with the addition of a subwoofer, i.e. a diffuser specialized for low frequencies. Diffusers for medium-high frequencies are usually disposed on or near the doors of the vehicle, for example on the dashboard. On the contrary, being very cumbersome, the subwoofer can be only housed in a large compartment, such as the vehicle trunk or under the seats.

In addition to being used for listening to music, said systems can be used to eliminate or muffle environmental noise, such as the rolling of the vehicle wheels on the road or the noise of the engine. It has been demonstrated that, being mainly composed of low frequencies, the best way to eliminate said noise is by using a subwoofer.

In view of the above, the vehicle comprises a noise reduction system comprising one or more microphones in order to detect the environmental noise.

The noise reduction system comprises a control unit, called Digital Signal Processor (DSP) that receives and processes the electrical signal detected by the microphone in order to generate a signal and send it to the subwoofer, in such a way that the subwoofer can generate a counternoise that cancels the environmental noise.

Said noise reduction systems are impaired by the fact that the counternoise generated by the subwoofer reaches the ears of the user with a delay caused by the distance between the subwoofer and the ear of the user. Consequently, the counternoise cannot effectively cancel the environmental noise in the vehicle compartment. Such a delay considerably reduces the capability of the Digital Signal Processor to generate the correct counternoise at the right moment.

Audio systems are known, which also comprise loudspeakers in the headrests of the vehicle, in addition to the diffusers in the doors and to the subwoofer in the vehicle trunk. Such audio systems can generate a noise with surround effect.

Because of the reduced space where they can be disposed, the loudspeakers in the headrest are loudspeakers for medium-high frequencies used to diffuse music with surround effect. In fact, a traditional subwoofer cannot be disposed in the headrest because of its large volume.

EP3072733 discloses an acoustic device disposed in a headrest.

The purpose of the present invention is to overcome the drawbacks of the prior art by devising a headrest for vehicles that contains a loudspeaker of subwoofer type that is suitable for reproducing the low frequencies and can be used in music applications and in noise cancellation applications.

Another purpose is to disclose a headrest for vehicles that is comfortable, reliable and safe for the user in case of accident.

These purposes are achieved according to the invention with the characteristics of the appended independent claim 1.

Advantageous embodiments appear from the dependent claims.

The headrest of the invention is suitable for being fastened to a vehicle seat. Said headrest comprises a front half-body against which the head of a user is rested. The front half-body has a concavity.

The headrest of the invention comprises a back half-body connected to the front half-body. The back half-body comprises a concavity directed towards the concavity of the front half-body, in such a way that the two half-bodies form a chamber. The back half-body comprises a back wall with a through wall provided with an edge that defines an annular seat.

The headrest of the invention comprises a reinforcing frame connected to at least one of the two half-bodies and intended to be fixed to the vehicle seat.

The headrest of the invention comprises a loudspeaker of subwoofer type in order to operate at low frequencies. The loudspeaker has at least one membrane. The loudspeaker is disposed in the seat of the back half-body in such a way to define a front chamber defined by the front half-body, the back half-body and the membrane of the loudspeaker.

The headrest according to the invention comprises a cover disposed behind the back half-body in such a way to cover said loudspeaker at least partially and form a back chamber defined by the cover, by the back wall of the back half-body and by the membrane of the loudspeaker.

The front chamber and the back chamber act as speaker for the loudspeaker, in such a way that the loudspeaker can operate as subwoofer at low frequencies.

Additional features of the invention will appear clearer from the detailed description below, which refers to merely illustrative, not limiting embodiments, which are shown in the appended drawings, wherein.

Figure 1:
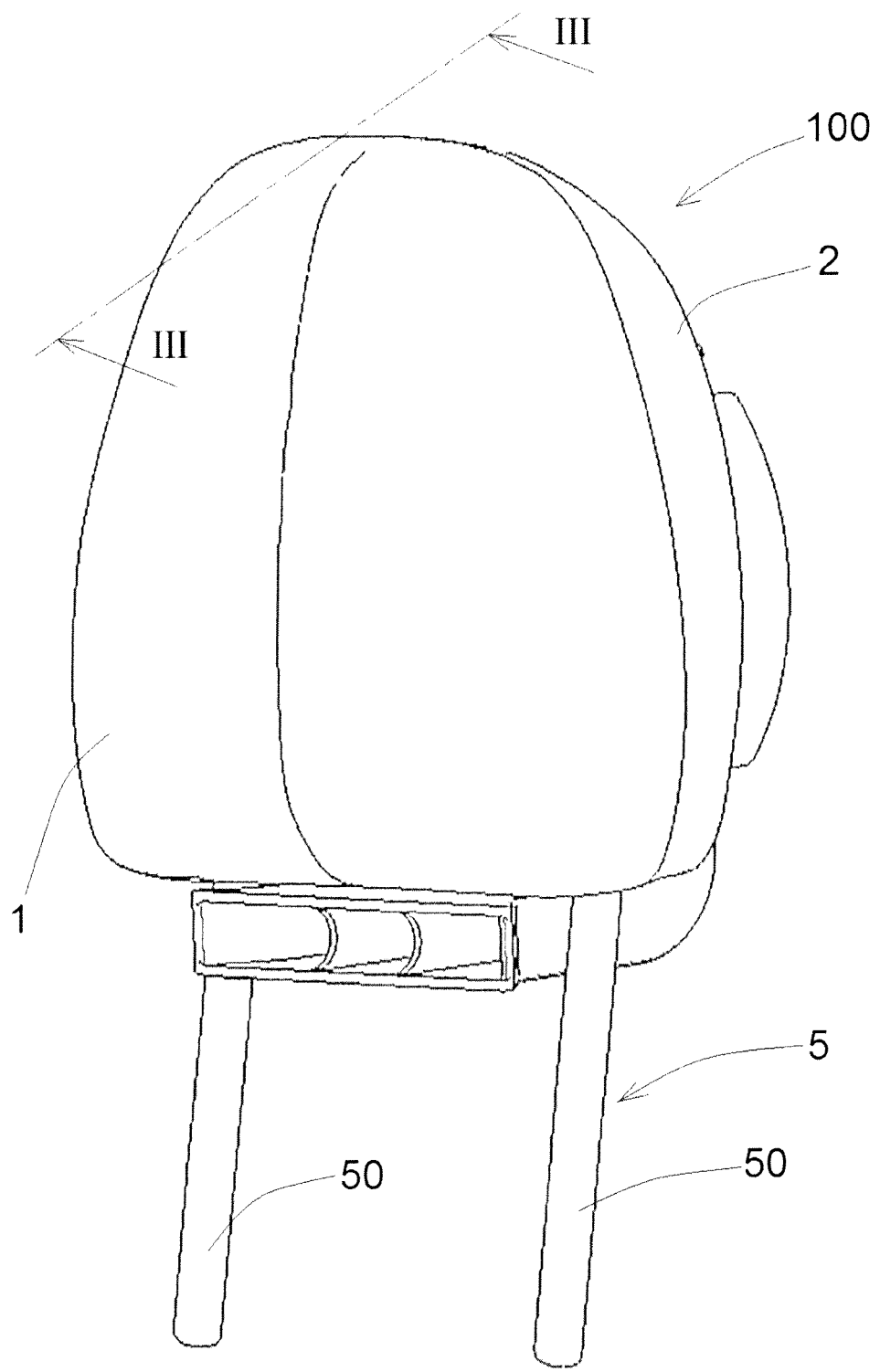
FIG. 1 is an axonometric view of a headrest according to the invention.
Figure 2:
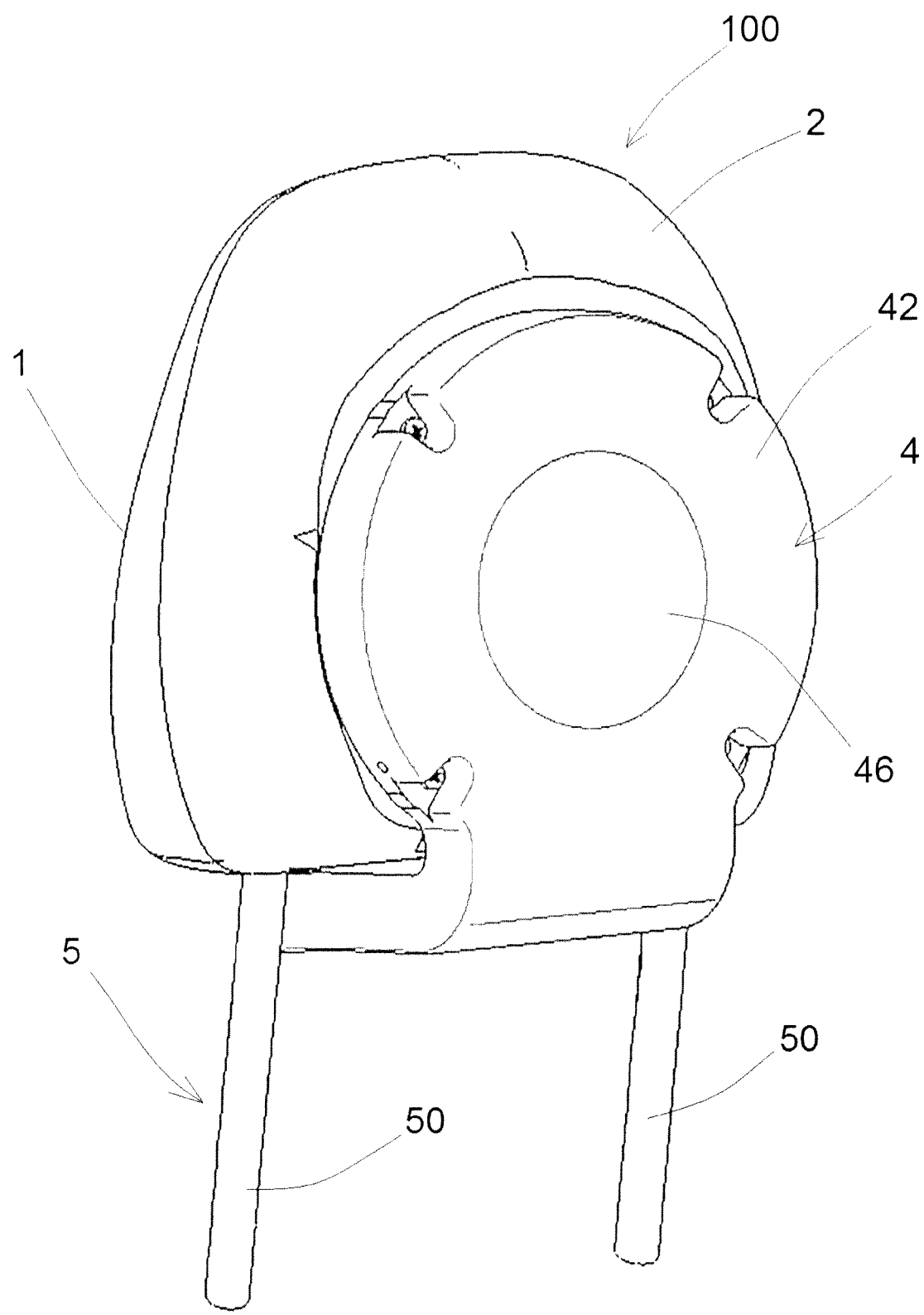
FIG. 2 is an axonometric view of the headrest of FIG. 1 seen from the back.
Figure 3:
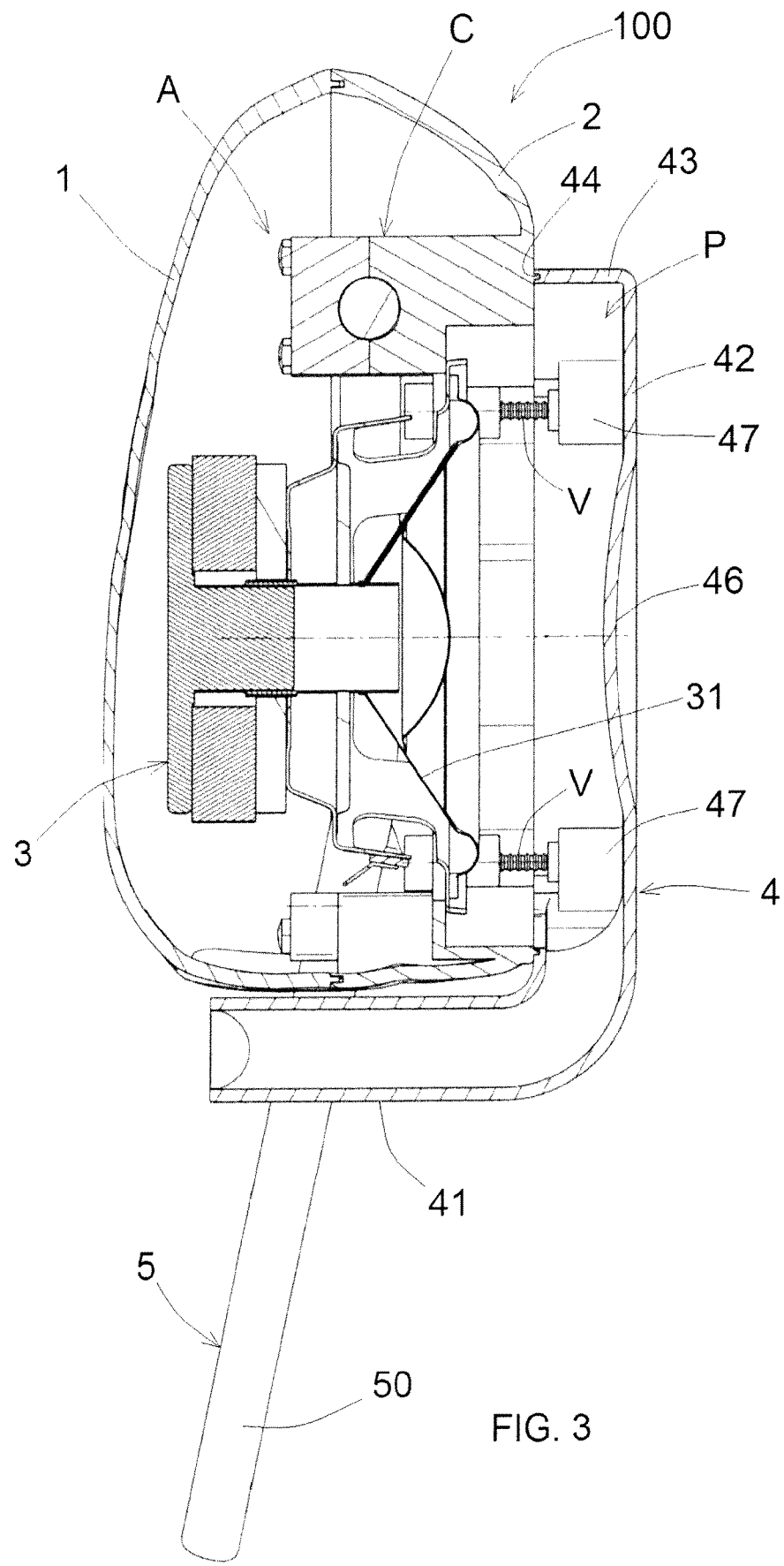
FIG. 3 is a section of the filter of FIG. 1 taken along the plane III-III of FIG. 1.

With reference to FIGS. 1 to 4, a headrest according to the invention is disclosed, which is generally indicated with reference numeral (100).

The headrest (100) is suitable for being fastened to a vehicle seat. The headrest (100) comprises a front half-body (1) where the head of a user is rested, and a back half-body (2) connected to the front half-body (1) by means of connection means (C). Advantageously, the connection means (C) comprise screws and fixing blocks.

The two half-bodies (1, 2) are concave. The concavity of the front half-body (1) is directed towards the concavity of the back half-body (2), in such a way to form a chamber.

A reinforcing frame (5) is partially disposed in the chamber between the two half-bodies. The reinforcing frame (5) has a "U-bent" tubular shape. The reinforcing frame (5) comprises two rectilinear sections (50) that protrude in lower position from the two half-bodies, and a connecting section (51) disposed in the chamber between the two half-bodies. The rectilinear sections (50) of the reinforcing frame are suitable for being inserted inside holes of a vehicle seat, in such a way to fasten the headrest (100) to the seat.

Alternatively, the reinforcing frame (5) can comprise at least one rod connected in lower position to a half-body or to both half-bodies.

Figure 4:
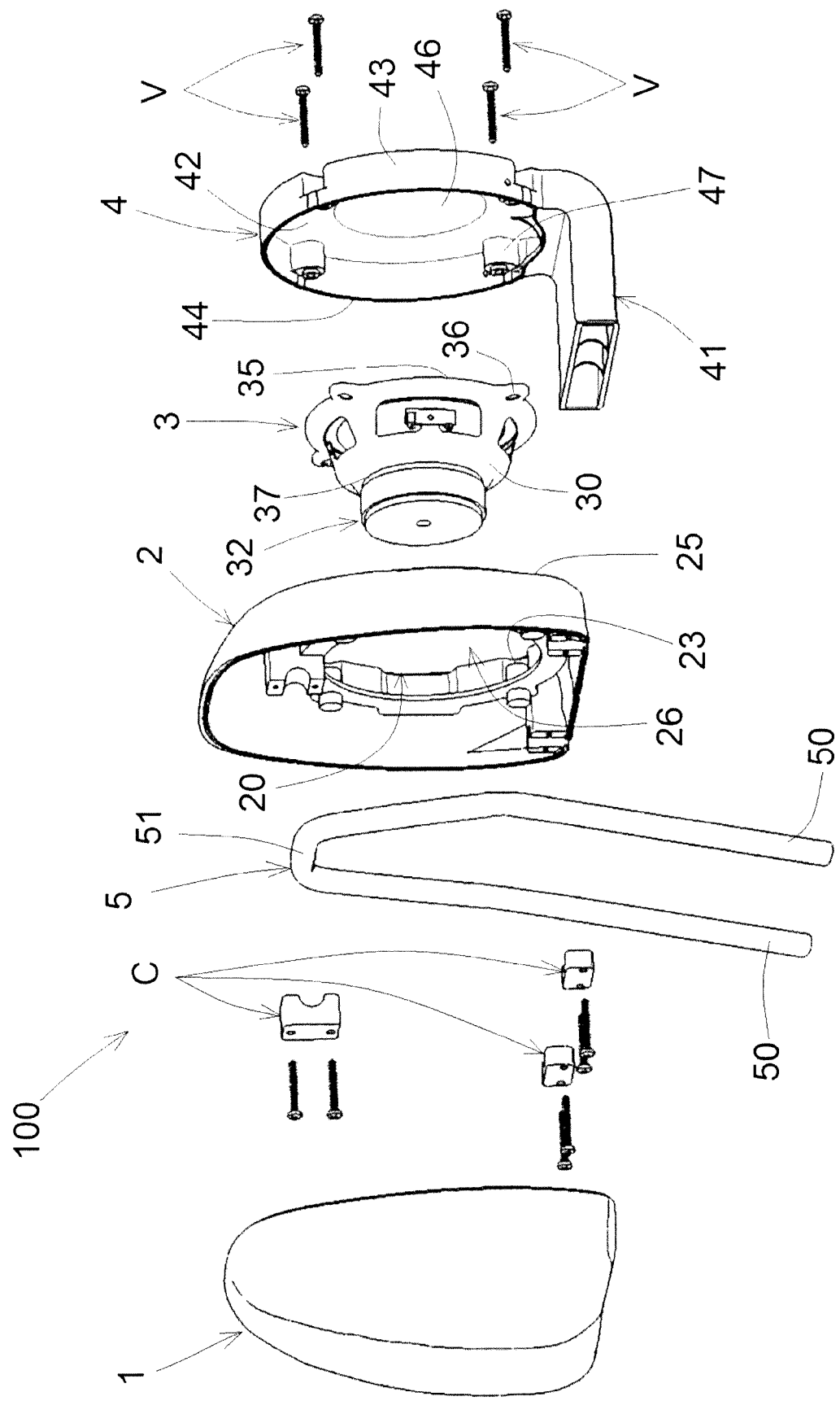
FIG. 4 is an exploded axonometric view of the headrest of FIG. 1, with a standard loudspeaker.

With reference to FIG. 4, the back half-body (2) comprises a back wall (25) wherein a through hole (26) is obtained and defined by an edge that defines an annular seat (20) suitable for receiving and supporting a loudspeaker (3). The through hole (26) is suitably dimensioned in such a way that the loudspeaker (3) completely covers said through hole (26).

The headrest (100) comprises a cover (4) disposed behind the back half-body (2). The cover (4) is fixed to the back wall (25) of the back half-body in such a way to cover the loudspeaker, at least partially. Optionally, the cover (4) can be also connected to the loudspeaker (3) to support the loudspeaker. The cover (4) has a disc-like shape.

The cover (4) comprises:
- a concave central portion (46) with outward concavity;
- a planar peripheral portion (42), and
- a cylindrical lateral wall (43) that protrudes from the front of the peripheral portion (42).

Shanks (47) protrude from the peripheral portion of the cover towards the back half-body (2). Said shanks (47) are provided with through holes in order to receive screw means (V) to fix the cover (4) to the back half-body (2).

The lateral wall (43) comprises an edge (44) suitable for touching against the back wall of the back half-body (2).

The back half-body (2) comprises threaded holes (23) to receive screw means (V) that pass through the shanks (47) of the cover.

The loudspeaker (3) is of subwoofer type and operates at low frequencies, i.e. at frequencies from 20 Hz and 300 Hz, preferably lower than 50 Hz. The loudspeaker (3) has an acoustic volume lower than 6 liters and a mobile mass higher than 20 g.

The loudspeaker (3) can be a subwoofer of standard type comprising:
- a basket (30) with a truncated-conical shape in such a way to define a seat;
- a magnetic unit (32) fixed to the basket (30) and suitable for generating a magnetic field,
- a mobile coil disposed in the seat of the basket (30) and centered in an air gap of the magnetic unit;
- a membrane (31) (shown in FIGS. 3 and 7) connected to the basket (30) and to the mobile coil, and
- at least one centering device fixed to the mobile coil and to the basket.

The basket (30) has a peripheral edge (35) from which perforated fixing portions (36) protrude, touching the shank (47) of the cover (4) and being crossed by the screw means (V). In view of the above, the shanks (47) act as fixing elements of the loudspeaker and as spacers to space the cover of the loudspeaker, maintaining the peripheral edge (35) of the basket at a distance from the cover (4). The basket (30) is inserted in the annular seat (20) of the back half-body.

The magnetic unit (32) is fixed to a central edge (37) of the basket. Therefore the magnetic unit (32) and a portion of the basket (30) are disposed in the chamber between the two half-bodies.

After mounting the loudspeaker (3) and the cover (4), the following is obtained:
- a front chamber (A) formed between the two half-bodies and the membrane (31) of the loudspeaker,
- a back chamber (P) formed by the cover (4), by the membrane (31) of the loudspeaker and by the back wall (25) of the back half-body (2).

The back wall (25) of the back half-body and the membrane (31) act as partition between the front chamber (A) and the back chamber (P).

Therefore, the front chamber (A) and the back chamber (P) act as speaker for the loudspeaker (3) and permit using the loudspeaker (3) as subwoofer at low frequencies without the need of a cumbersome speaker. Such a speaker can be configured with different types of acoustic loads in low frequency.

Figure 7:
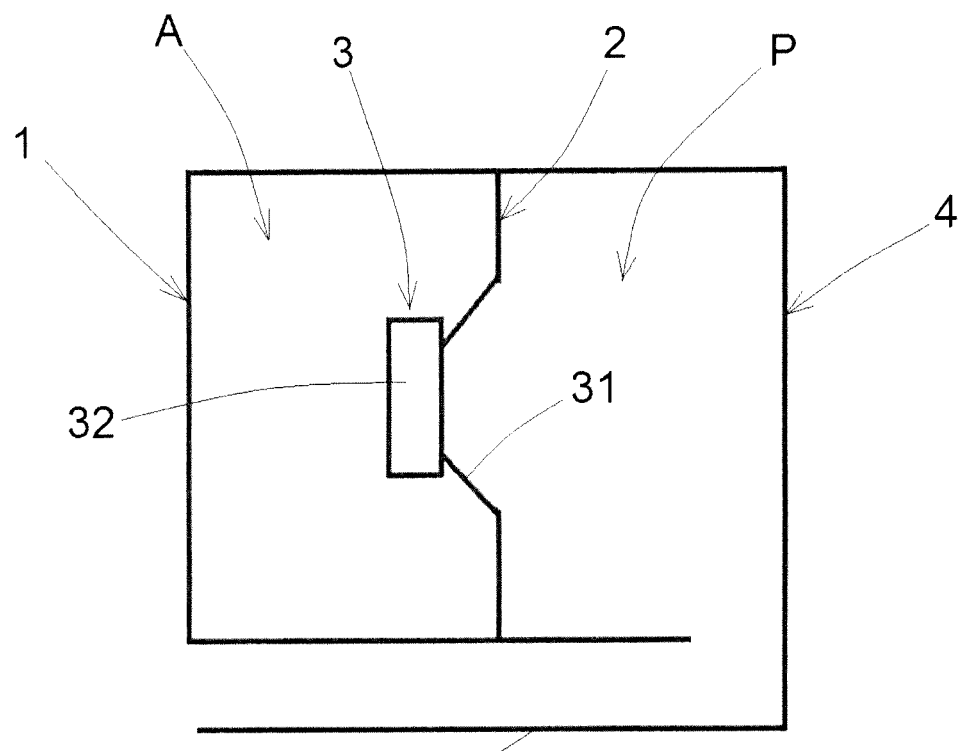
FIGS. 7 to 12 are diagrammatic side views that show different configurations of the headrest according to the invention in order to obtain different acoustic loads.

FIGS. 4 and 7 show a first type of acoustic load called "fourth order bandpass", wherein the cover (4) comprises a sound diffusion pipe (41) that protrudes in lower position from the cover (4). The sound diffuser pipe (41) is bent in such a way to pass under the back half-body (2), ending in correspondence of the front half-body (1). The sound diffuser pipe (41) communicates with the back chamber (P) in such a way that the sound emitted by the loudspeaker (3) is conveyed into the sound diffuser pipe (41) and diffused near the ears of the user. In such a case, the front chamber (A) and the back chamber (P) are insulated.

Figure 8:
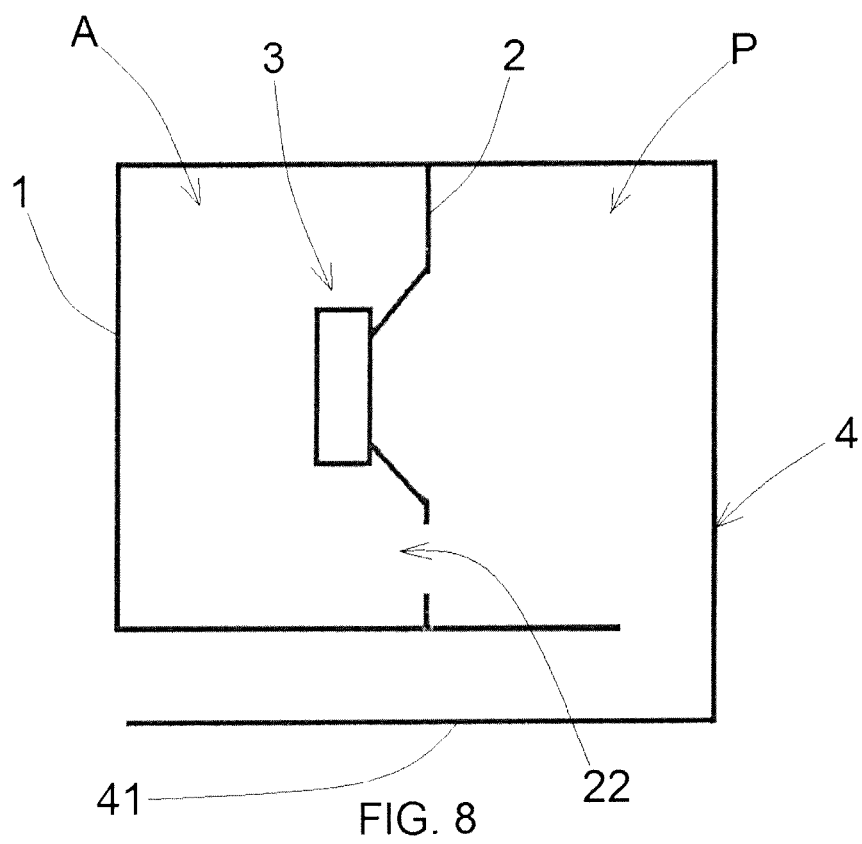

FIG. 8 shows a second type of acoustic load, called "interport", which differs from the first type of acoustic load because the back half-body (2) comprises a hole (22), in such a way that the front chamber (A) and the back chamber (P) are in communication.

Figure 9:
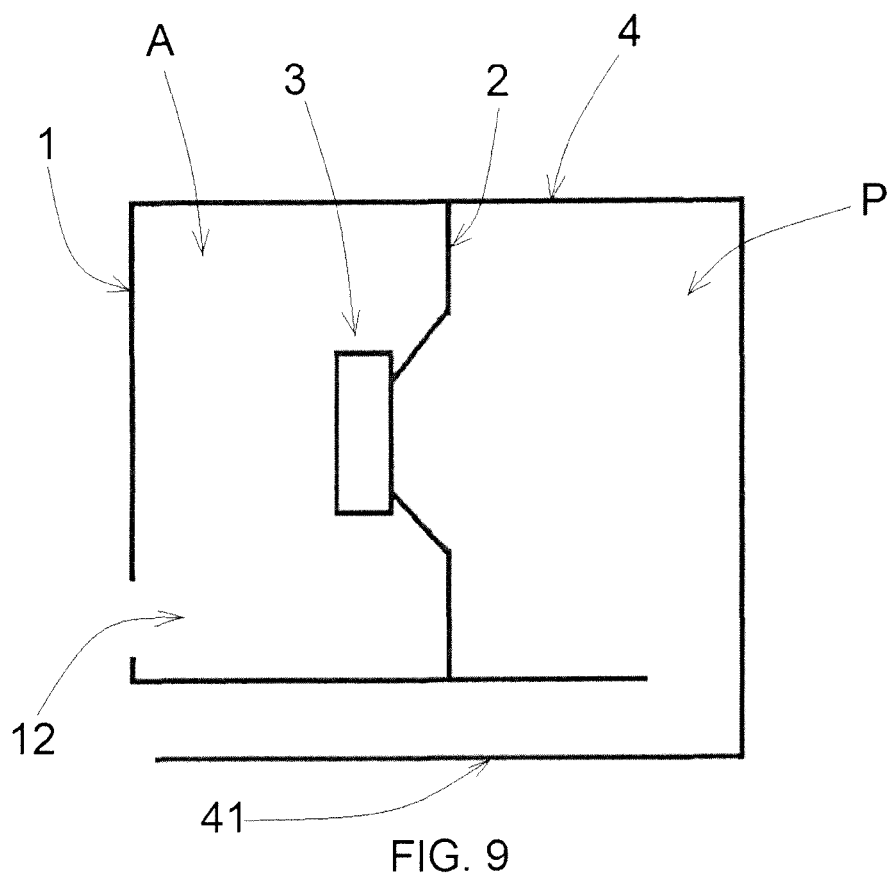

FIG. 9 shows a third type of acoustic load, called "dual reflex", which differs from the first type of acoustic load because the front half-body (1) comprises a hole (12), in such a way that the front chamber (A) is in communication with the exterior.

Figure 10:
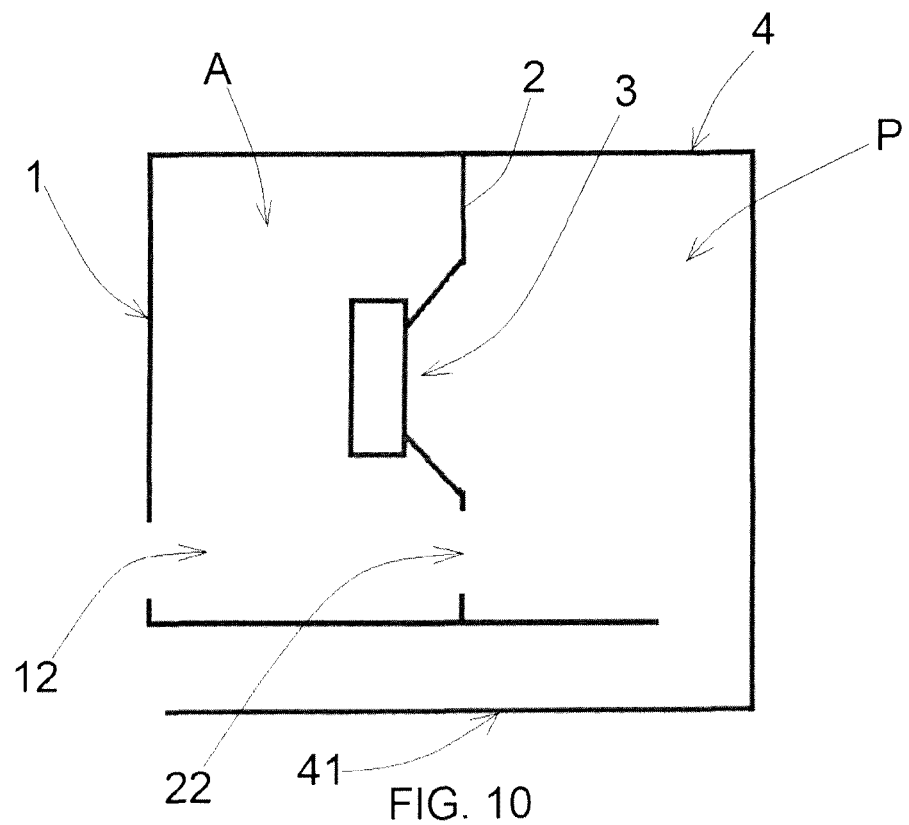

FIG. 10 shows a fourth type of acoustic load that differs from the first type of acoustic load because the front half-body (1) and the back half-body (2) comprise a hole (12, 22), in such a way that the front chamber (A) is in communication with the exterior and the back chamber (P) is in communication with the front chamber (A).

Figure 11:
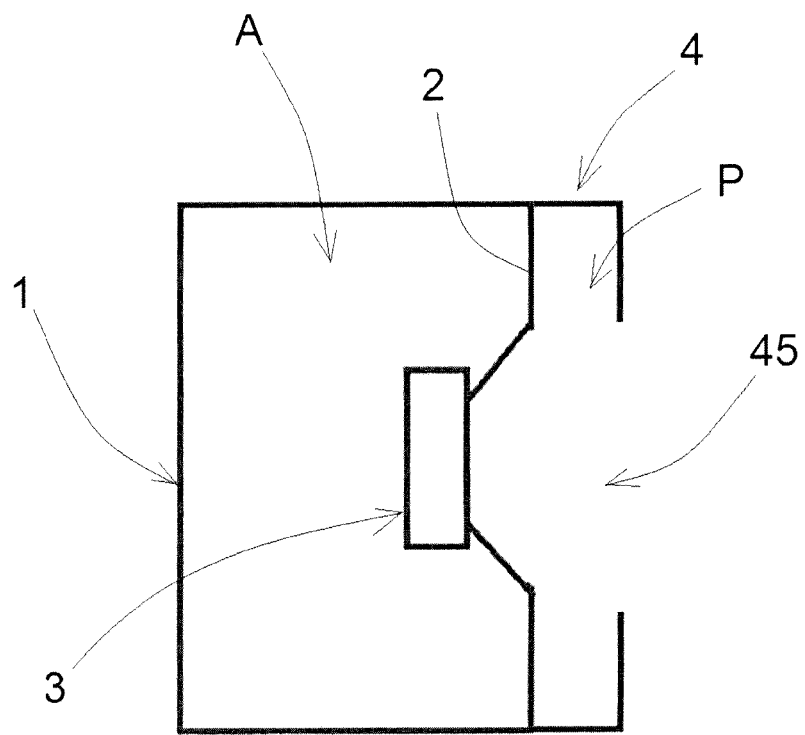

FIG. 11 shows a fifth type of acoustic load, called "closed box", wherein the cover (4) comprises an opening (45) suitable for letting the sound out from the back chamber (P) towards the back of the headrest (100). In such a case, the front chamber (A) and the back chamber (P) are insulated.

Figure 12:
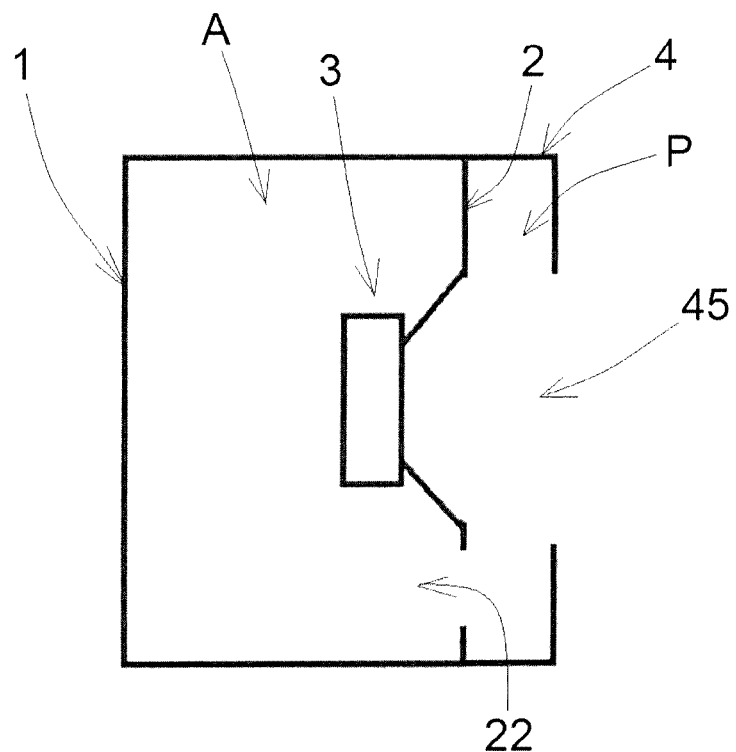

FIG. 12 shows a sixth type of acoustic load, called "bass reflex", which differs from the fifth type of acoustic load because the back half-body (2) comprises a hole (22), in such a way that the front chamber (A) and the back chamber (P) are in communication.

Figure 5:
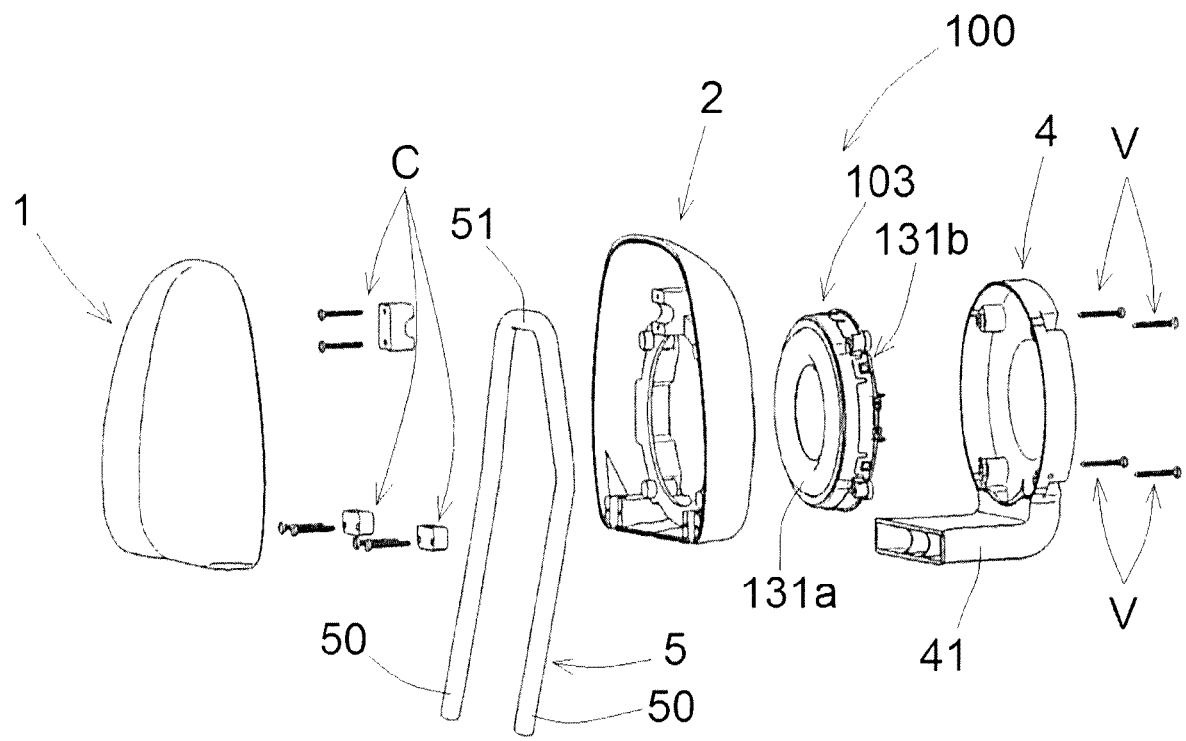
FIG. 5 is an exploded axonometric view of the headrest of FIG. 1, with an ultraflat loudspeaker.
Figure 6:
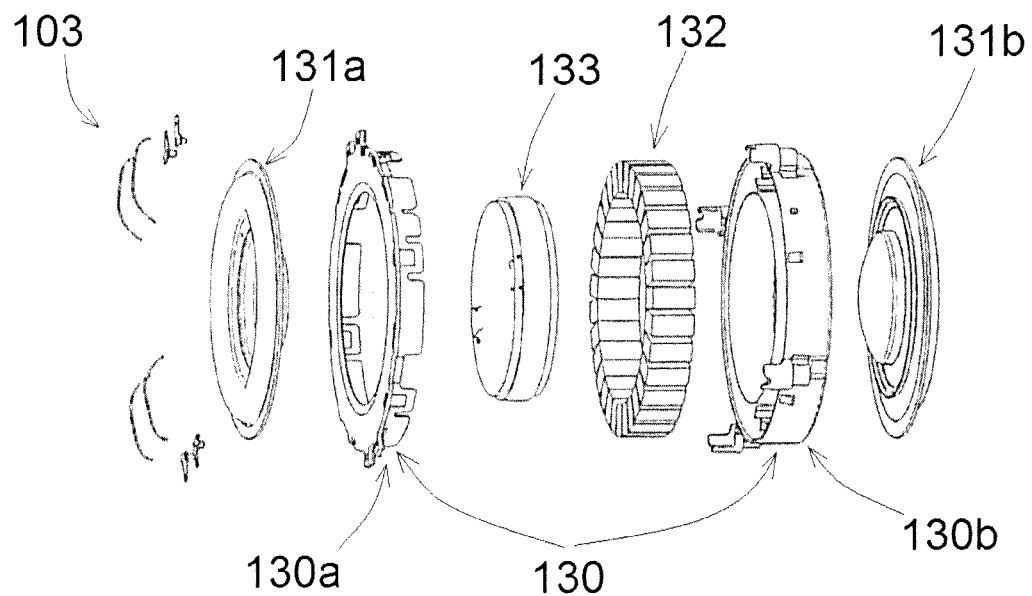
FIG. 6 is an exploded axonometric view of the ultraflat loudspeaker of FIG. 5.

With reference to FIGS. 5 and 6, as an alternative to the loudspeaker (3) of standard type, the headrest (100) can comprise a subwoofer loudspeaker (103) of ultraflat type. Such a type of loudspeaker is disclosed in WO2012/171846.

Said loudspeaker (103) comprises:
- a case (130) having a flat annular shape and comprising an annular seat;
- an annular magnetic unit (132) disposed in the annular seat of the case;
- a coil (133) surrounded by the case (130);
- a front membrane (131a) fixed to a front side of the case (130) and
- a back membrane (131b) fixed to a back side of the case (130).

The case (130) comprises two half-bodies (130a) and (130b) that are coupled in such a way to enclose the magnetic unit (132).

The loudspeaker (103) is disposed in the annular seat (20) of the back half-body (2) in such a way that the front membrane (131a) is directed towards the front half-body (1) and the back membrane (131b) is directed towards the cover (4). In such a case, the front chamber (A) is defined by the front half-body (1), by the back half-body (2) and by the front membrane (131a). Instead, the back chamber (P) is defined by the cover (4), by the back wall (25) of the back half-body (2) and by the back membrane (131b) of the loudspeaker.

Because of said structure, the loudspeaker (103) does not need a basket, and therefore it has a smaller volume than the standard loudspeaker (3). In this way, compact headrests with low thickness can be obtained.

Moreover, the headrest with the ultraflat loudspeaker (103) is easier to design than the headrest with the standard loudspeaker (3). In fact, the annular case (130) of the ultraflat loudspeaker (103) can be disposed in such a way that the opening of said case is disposed in the area where the user normally rests his or her head.

It must be noted that the standard loudspeaker (3) has a cumbersome basket (30) disposed in axial direction and provided with reinforcing elements. Such a type of basket protrudes relative to the reinforcing frame (5). Therefore, such a type of basket may be dangerous in case of accidents.

Instead, the ultraflat loudspeaker (103) does not have a basket and is provided with a close, compact case that is safe in case of accident. Moreover, the head of the user can be protected by disposing the case (130) behind the connecting section (51) of the reinforcing frame.

Furthermore, because of the very low thickness of the ultraflat loudspeaker, two ultraflat loudspeakers can be disposed in mechanically opposition, i.e. one in front of the other, in push-push configuration. In view of the above, the vibration caused by the mobile masses of the loudspeakers can be cancelled in real time without having to process the signals, introducing a delay in the generation of the environmental noise.

The loudspeaker in the headrest (100) can be connected to a stereo system for music diffusion or can be connected to a control unit (not shown in the figures) to eliminate the environmental noise.

Figure 13:
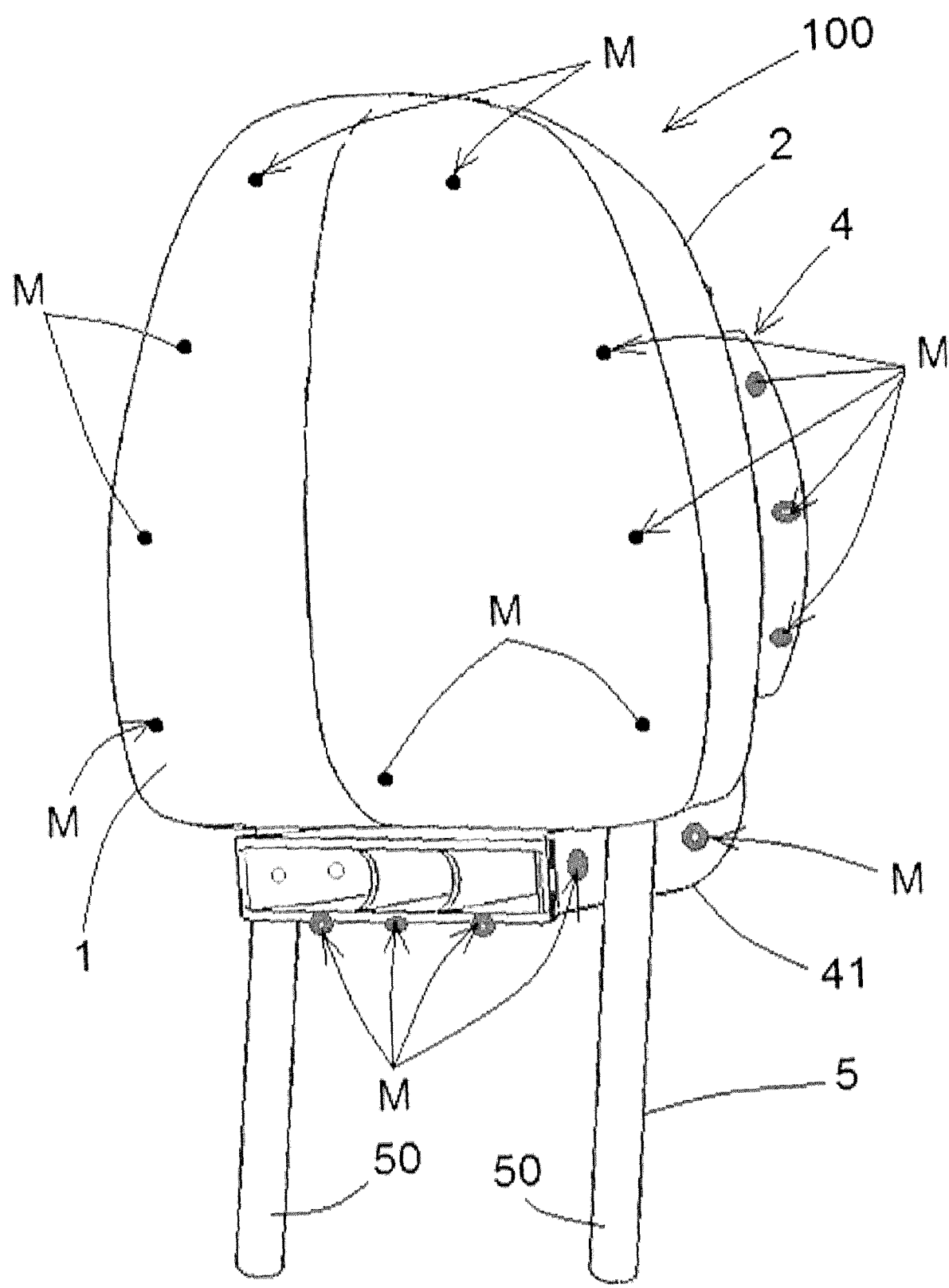
FIG. 13 is an axonometric view of a headrest according to the invention, comprising microphones.

With reference to FIG. 13, the headrest (100) optionally comprises at least one microphone (M) disposed inside a seat of the headrest (100) obtained in the front, in the back and/or on the side of the headrest (100). In particular, the microphone (M) can be disposed inside a seat obtained in one of the two half-bodies or on the cover (4) or on the sound diffusion pipe (41) that protrudes in lower position from the cover (4).

The microphone (M) can be used for audio applications, such as for example to generate a feedback audio signal for equalization, for telephone communication and/or for the detection of voice controls given by the user.

The microphone (M) can be connected to the control unit in order to cancel the environmental noise. The microphone (M) detects the environmental noise and generates an electrical signal that is transmitted to the control unit. The control unit is provided with a Digital Signal Processor (DSP) that processes the electrical signal transmitted by the microphone (M) and transmits a signal to the loudspeaker, in such a way that the loudspeaker emits a counternoise that cancels the environmental noise. Because of the fact that the loudspeaker is in the headrest (100), the counternoise generated by the loudspeaker reaches the ears of the user without delay. Being disposed in the headrest (100) near the ears of the user, the microphone (M) captures the environmental noise exactly as it is perceived by the ears of the user. Consequently, the loudspeaker can generate a counternoise that effectively cancels the environmental noise perceived by the user without delay.

Advantageously, the headrest (100) comprises an array of microphones (M) suitable for being configured in such a way to obtain a noise capturing system.

The microphones (M) of the array can be disposed on the headrest (100) according to different configurations.

For example, the array of microphones can comprise:
a first set of microphones disposed inside seats obtained in upper position on the front and/or the back half-body;
a second set of microphones disposed inside seats obtained in lower position on the front and/or the back half-body;
a third set of microphones disposed inside seats obtained on a first side of the front and/or the back half-body;
a fourth set of microphones disposed inside seats obtained on a second side of the front and/or the back half-body.

Alternatively, the array of microphones comprises microphones (M) disposed:
inside seats obtained in frontal position around a peripheral portion on the front and/or the back half-body;
inside seats obtained in lateral position on the front and/or the back half-body.

Alternatively or additionally, one or more microphones (M) of the array of microphones can be disposed on the cover (4). For example, one or more microphones (M) can be disposed on the lateral wall (43) of the cover, on the sides of the sound diffusion pipe (41) and/or in the mouth of the sound diffusion pipe (41).

Because of the fact that an array of microphones is disposed on the headrest, not only the environmental noise perceived by the user sitting on the seat where the headrest (100) is connected can be captured, but also the environmental noise perceived near the headrest (100).

Moreover, said microphones (M) can be also used to capture sounds coming from the passenger sitting on the seat where the headrest (100) is connected.

The control unit can use the most suitable configuration of such microphones in order to perform the various functions of the microphones. In particular, the microphones can be used as "directive" microphones to capture sounds coming from specific sources, such as for example the user sitting on the seat where the headrest (100) is connected, or as environmental microphones in order to capture the environmental noise perceived around the headrest (100). Such advantages are possible because the microphones (M) are disposed in the headrest (100) near the mouth and the ears of the user.

In addition to being electronically versatile, the array of microphones is also mechanically versatile. In fact, the microphones can be arranged in different positions on the headrest (100). Because of the versatile position of the array of microphones, the design of the headrest (100) has no aesthetic or mechanical constraints.

Numerous variations and modifications can be made to the present embodiments of the invention, which are within the reach of an expert of the field, falling in any case within the scope of the invention as disclosed by the appended claims.

The invention claimed is:
1. A headrest for use with a seat of a vehicle, the headrest comprising:
a front half-body having a concavity, said front half-body adapted to allow a head, of a user to rest thereagainst;
a back half-body connected to said front half-body, said back half-body having a concavity that faces the concavity of said front half-body such that said front half-body and said back half-body define a chamber, said back half-body comprising a back wall with a through hole having an edge that defines an annular seat;

a reinforcing frame connected to at least one of said front half-body and said back half-body, said reinforcing frame adapted to be fixed to the seat of the vehicle;

a loudspeaker having at least one membrane, said loudspeaker disposed in the annular seat of said back half-body so as to form a front chamber defined by said front half-body and said back half-body and by the at least one membrane of said loudspeaker, said loudspeaker being a subwoofer; and a cover disposed behind said back half-body so as to at least partially cover said loudspeaker and to form a back chamber defined by said cover and by a back wall of said back half-body and by the at least one membrane of said loudspeaker, the front chamber and the back chamber acting as a speaker for said loudspeaker, said cover comprising a sound diffuser pipe that protrudes at a lower position from said cover, the sound diffuser pipe being in communication with the back chamber such that sound emitted by said loudspeaker is conveyed into the sound diffuser pipe.

2. The headrest of claim 1, wherein said cover is connected to both of said back half-body and to said loudspeaker so as to support said loudspeaker.

3. The headrest of claim 2, wherein said cover comprises shanks that protrude toward said back half-body so as to serve as fixing elements of said loudspeaker and as spacers that space said cover from said loudspeaker.

4. The headrest of claim 1, wherein said sound diffuser pipe is bent so as to pass under said back half-body and to terminate in correspondence to said front half-body.

5. The headrest of claim 1, wherein said front half-body comprises a hole, the hole communicating between the front chamber and an exterior environment.

6. The headrest of claim 1, wherein said cover has an opening adapted to emit sound from the back chamber toward a back of the headrest.

7. The headrest of claim 1, wherein said back half-body has a hole such that the front chamber is in communication with the back chamber.

8. The headrest of claim 1, wherein said loudspeaker has a frequency range of between 20 Hz and 300 Hz and an acoustic volume of less than six liters.

9. The headrest of claim 1, wherein said loudspeaker comprises:
a basket having a truncated-conical shape so as to define a seat;
a magnetic unit fixed to said basket, said magnetic unit adapted to generate a magnetic field;
a mobile coil disposed in the seat of said basket and centered in an air gap of said magnetic unit; and
at least one centering device affixed to said mobile coil and to said basket.

10. A headrest for use with a seat of a vehicle, the headrest comprising:
a front half-body having a concavity, said front half-body adapted to allow a head of a user to rest thereagainst;
a back half-body connected to said front half-body, said back half-body having a concavity that faces the concavity of said front half-body such that said front half-body and said back half-body define a chamber, said back half-body comprising a back wall with a through hole having an edge that defines an annular seat;
a reinforcing frame connected to at least one of said front-half-body and said back half-body, said reinforcing frame adapted to be fixed to the seat of the vehicle;
a loudspeaker having at least one membrane, said loudspeaker disposed in the annular seat of said back half-body so as to form a front chamber defined by said front half-body and said back half-body and by the at least one membrane of said loudspeaker, said loudspeaker being a subwoofer; and
a cover disposed behind said back half-body so as to at least partially cover said loudspeaker and to form a back chamber defined by said cover and by a back wall of said back half-body and by the at least one membrane of said loudspeaker, the front chamber and the back chamber acting as a speaker for said loudspeaker, said loudspeaker comprising:
a case having a flat annular shape and an annular seat;
an annular magnetic unit disposed in the annular seat of said case; and
a coil surrounded by said case, the at least one membrane comprising:
a back membrane affixed to a back side of said case, the front chamber being defined by said front half-body and by said back half-body and by said front membrane, the back chamber being defined by said cover and by the back wall of said back half-body and by said back membrane of said loudspeaker, said case of said loudspeaker being disposed behind said reinforcing frame.

11. The headrest of claim 10, wherein said loudspeaker comprises a pair of loudspeaker disposed one in front of another.

12. The headrest of claim 10, further comprising:
at least one microphone disposed inside the seat formed by the concavities of said front half-body and said back half-body.

* * * * *